(12) United States Patent
Chen et al.

(10) Patent No.: US 7,512,814 B2
(45) Date of Patent: Mar. 31, 2009

(54) SECURE AND SEARCHABLE STORAGE SYSTEM AND METHOD

(75) Inventors: Paul Chen, Toronto (CA); Christopher Tebo, Toronto (CA)

(73) Assignee: Fortiva Inc. (CA)

( * ) Notice: Subject to any disclaimer, the term of this patent is extended or adjusted under 35 U.S.C. 154(b) by 845 days.

(21) Appl. No.: 10/983,890

(22) Filed: Nov. 9, 2004

(65) Prior Publication Data

US 2006/0101285 A1 May 11, 2006

(51) Int. Cl.
G06F 11/30 (2006.01)
H04L 9/00 (2006.01)

(52) U.S. Cl. .................. 713/193; 713/158; 713/182

(58) Field of Classification Search .............. 713/193, 713/158, 182
See application file for complete search history.

(56) References Cited

U.S. PATENT DOCUMENTS

| | | | | |
|---|---|---|---|---|
| 5,559,888 | A | | 9/1996 | Jain et al. |
| 5,963,642 | A | * | 10/1999 | Goldstein ............. 713/193 |
| 6,516,337 | B1 | * | 2/2003 | Tripp et al. ............. 709/202 |
| 6,796,489 | B2 | * | 9/2004 | Slater et al. ............. 235/379 |
| 6,807,632 | B1 | * | 10/2004 | Carpentier et al. ......... 713/165 |
| 7,010,144 | B1 | * | 3/2006 | Davis et al. ............. 382/100 |
| 7,062,500 | B1 | * | 6/2006 | Hall et al. ............. 707/102 |
| 7,246,246 | B2 | * | 7/2007 | Kupka et al. ............. 713/189 |
| 7,251,832 | B2 | * | 7/2007 | Venters et al. ............. 726/26 |
| 7,322,047 | B2 | * | 1/2008 | Redlich et al. ............. 726/27 |
| 7,334,124 | B2 | * | 2/2008 | Pham et al. ............. 713/162 |
| 2001/0037460 | A1 | * | 11/2001 | Porcari ................ 713/201 |
| 2002/0049738 | A1 | * | 4/2002 | Epstein ............... 707/1 |
| 2002/0120925 | A1 | * | 8/2002 | Logan ................ 725/9 |
| 2004/0221163 | A1 | * | 11/2004 | Jorgensen et al. ......... 713/182 |
| 2005/0132207 | A1 | * | 6/2005 | Mourad ............... 713/189 |
| 2005/0152553 | A1 | * | 7/2005 | Kosugi et al. ........... 380/286 |

FOREIGN PATENT DOCUMENTS

| | | |
|---|---|---|
| WO | 02/073862 A2 | 9/2002 |
| WO | 03/014888 A1 | 2/2003 |
| WO | 2004/034182 A2 | 4/2004 |

OTHER PUBLICATIONS

Transmittal, International Search Report, and the Written Opinion of the International Searching Authority for Application No. PCT/IB2005/004124, mailed Oct. 31, 2006.

* cited by examiner

*Primary Examiner*—Emmanuel L Moise
*Assistant Examiner*—Techane J Gergiso
(74) *Attorney, Agent, or Firm*—Katten Muchin Rosenman LLP

(57) ABSTRACT

A system and method for securely storing electronic documents is provided. The system includes a client portion and a server portion and the client portion is located at a trusted location. The client portion encrypts each electronic document and produces a list of terms of interest relating to the document, which terms are also encrypted. The encrypted document and the encrypted terms are transferred to a server portion which need not be located at a trusted location. The document is stored at the server portion in a manner which allows for locating the document again via the encrypted terms and returning the encrypted document to the trusted client portion, where it can be decrypted. Attachments to documents can also be encrypted and stored at the server, as can copies of dynamic documents, such as web pages. The server portion can also have a retention manager and encryptor which is used to implement document retention and destruction policies defined by the user of the system.

9 Claims, 2 Drawing Sheets

SECURE AND SEARCHABLE STORAGE SYSTEM AND METHOD

FIELD OF THE INVENTION

The present invention relates to a system and method for storing electronic documents in a secure and yet searchable manner. More specifically, the present invention relates to system and method for a third party, who is not necessarily trusted, to store electronic documents of a first party in a manner which allows the first party to search and retrieve stored documents without the third party having access to the contents of the documents.

BACKGROUND OF THE INVENTION

Electronic documents are increasingly relied upon to operate businesses and governments. In particular, email has become one of, if not the most, relied upon day to day communication media for running many businesses and government functions.

For a variety of business and legal requirements, it is desired by organizations to appropriately maintain copies of electronic copies of documents, such as emails, for various periods of time. It is also desired to be able to "prove" the existence of electronic documents and their date of creation, modification, etc.

Previous attempts to maintain copies of electronic documents have principally comprised the production of archive copies of the electronic documents which are stored in a safe location, however such archiving activities suffer from a number of disadvantages. For example, even small organizations produce large numbers of emails every day and archives of email communications can quickly grow to massive sizes. Accordingly, the processing to create, maintain and, in the event it is desired to retrieve a document from an archive, search such archives can quickly overwhelm an organization's computer resources.

Further, such archives must be stored in a safe location, which typically requires the delivery, and often a physical delivery, of media containing the archive to the safe location, with the related risks of loss or copying of the archive in transit, providing proper controls to limit access to the archive, etc. and the associated delays in gaining access to the archive, should access be required for legitimate purposes.

Also, in the event that it is desired or necessary (perhaps for legal evidentiary purposes) to prove the date an electronic document was created and/or to prove that it has not been modified, it can be difficult or impossible for an organization to prove that its archives are correct and unmodified. Finally, such archives of electronic documents do not implement the document retention policies of many businesses and/or governments, with documents in such archives being retained for the life of the archive.

To address some of these issues, third party services have been proposed wherein the organization's archive is stored by a third party. The third party can be equipped to deal with the computational and logistical expenses of maintaining the organization's archives, thus freeing computer resources of the organization and, the involvement of such a third party can assist in establishing the evidentiary status of an electronic document as the third party should be able to evidence when an archive was received and/or whether it has since been modified.

However, problems exist with existing third party service schemes in that, to provide any service other than just a storage facility, the third party must be trusted. If the third party is not trusted, then an organization must either encrypt all of its archives before they are passed to the third party, or take the risk that unauthorized use will be made of its archives or that the archives can be modified by the third party. Even if the organization is willing to accept the risk of access by the third party, despite the possibility of corporate espionage or other risks, under many regulatory regimes an organization is not permitted to assume such a risk due to privacy laws, securities laws and other statutory regulations.

If the organization's archives are encrypted before being sent to the third party, which is therefore generally required, the organization cannot search for and/or retrieve copies of individual electronic documents from the archives stored at the third party. To search the archive, a copy of the entire encrypted archive must be returned to the organization (in some appropriately secure manner), the archive then being decrypted by the organization and searched to identify and/or retrieve a desired copy of an electronic document. If it is necessary to evidence the provenance of a document, it will likely be necessary for the organization to cause the third party to provide a copy of the encrypted archive, along with evidence that the archive is unaltered and has been in the care of the third party for a stated time period, and the necessary decryption key provided to a trusted authority who can then perform the decryption and retrieval again to verify the provenance of the document.

Clearly, such a system suffers from a variety of disadvantages especially if the number of archives to be searched is large and in the requirement to provide complete copies of the encrypted archives and the decryption keys to the trusted authority. Further, there still remains some difficulty in proving that the archive was not altered and was stored with the third party for the stated time period. Also, such a system prevents the organization from easily implementing a document retention policy for its electronic documents.

While such systems might be workable for meeting regulatory or legal requirements, they are onerous and/or expensive for an organization which merely needs to locate an archived document for internal purposes and/or for an organization which may have to fulfill many requests for archived material.

SUMMARY OF THE INVENTION

It is an object of the present invention to provide a novel system and method for storing electronic documents in a secure, yet searchable manner, which obviates or mitigates at least one disadvantage of the prior art.

According to a first aspect of the present invention, there is provided a system for storing electronic documents in a secure and searchable manner, the system including a client portion and a server portion, the client portion being located at a trusted location and comprising: a parser to parse electronic documents received at the client portion to identify terms of interest within the received electronic document; a search and retrieval interface to specify one or more terms of interest to identify and retrieve one or more documents from the server portion; a first encryptor to encrypt identified terms of interest to obtain cipher text versions of the terms of interest; a second encryptor to encrypt the received document to obtain a ciphertext version of the received document; a decryptor to decrypt a ciphertext version of a retrieved document to obtain a plaintext version; and client communications means to transfer the ciphertext version of the received document and/or the ciphertext version of the identified terms to a server portion and to receive a ciphertext version of documents from the server portion; and the server portion comprising: server communications means to receive from a client portion the ciphertext version of a document and the ciphertext version of identified terms and to transfer the ciphertext version of an identified document to the client portion; a storage device to store ciphertext versions of documents received from the client portion; and an indexer and search engine to construct and maintain a searchable index of received ciphertext versions of identified terms contained in the ciphertext versions of documents received from the client portion and responsive to the search and retrieval interface of the client portion to cause the storage device and the server communications means to transfer ciphertext copies of the identified documents of interest to the client portion.

Preferably, the server portion further includes: an encryptor to encrypt ciphertext documents received at the server portion and to decrypt ciphertext documents to be transferred to the client portion; a retention manager operable to determine the relevant destruction date for each ciphertext document received at the server portion; and a retention key manager storing an encryption key for each destruction date of documents stored in the storage device, the retention key manager responsive to the retention manager to provide the encryption key for the relevant destruction date to the encryptor and to destroy encryption keys whose related destruction date has passed.

Also preferably, the client portion is further operable to encrypt and transfer to the server portion ciphertext copies of attachments to documents received at the client portion and the server portion is further operable to index and store the ciphertext copies of attachments in the storage device.

According to another aspect of the present invention, there is provided method of securely storing electronic documents in a secure and searchable manner, comprising the steps of: at a trusted location, receiving copies of electronic documents to be stored; parsing the received copies to identify terms of interest in the documents; encrypting the received documents to obtain ciphertext versions of the received documents and encrypting the identified terms of interest found in each document to obtain ciphertext copies of the terms; transferring the ciphertext copies of the documents and identified terms to a second location over a communications link; receiving the ciphertext copies of the documents at the second location and storing received ciphertext copies on a storage device; receiving the ciphertext copies of the identified terms of interest at the second location and constructing and maintaining an index which indicates, for each received ciphertext term of interest, the storage location of each ciphertext copy of the documents which contains the term of interest; and providing a search interface at the trusted location wherein a user can search for a stored ciphertext copy of a document stored on the storage device by defining a query containing one or more plaintext terms of interest, the plaintext terms of interest being encrypted and, over the communications link, being compared to the ciphertext terms in the index to identify the ciphertext copies of documents stored on the storage device; and transmitting the identified ciphertext copies of documents over the communications link to the trusted location and decrypting the transmitted ciphertext copies of the documents at the trusted location to obtain plaintext copies of the identified documents.

Preferably, the method further comprises the step of maintaining a list of identified terms of interest at the trusted location and accepting queries at the search interface including one or more wildcard operators and examining the maintained list of identified terms of interest to expanding the wildcard operators in the query.

The present invention provides a system and method for securely storing electronic documents. The system includes a client portion and a server portion and the client portion is located at a trusted location. The client portion encrypts each electronic document and produces a list of terms of interest relating to the document, which terms are also encrypted. The encrypted document and the encrypted terms are transferred to a server portion which need not be located at a trusted location. The encrypted document is stored at the server portion in a manner which allows for locating the document again via the encrypted terms and returning the encrypted document to the trusted client portion, where it can be decrypted. Attachments to documents can also be encrypted and stored at the server portion, as can copies of dynamic documents, such as web pages. The server portion can also have a retention manager and encryptor which is used to implement document retention and destruction policies defined by the user of the system.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
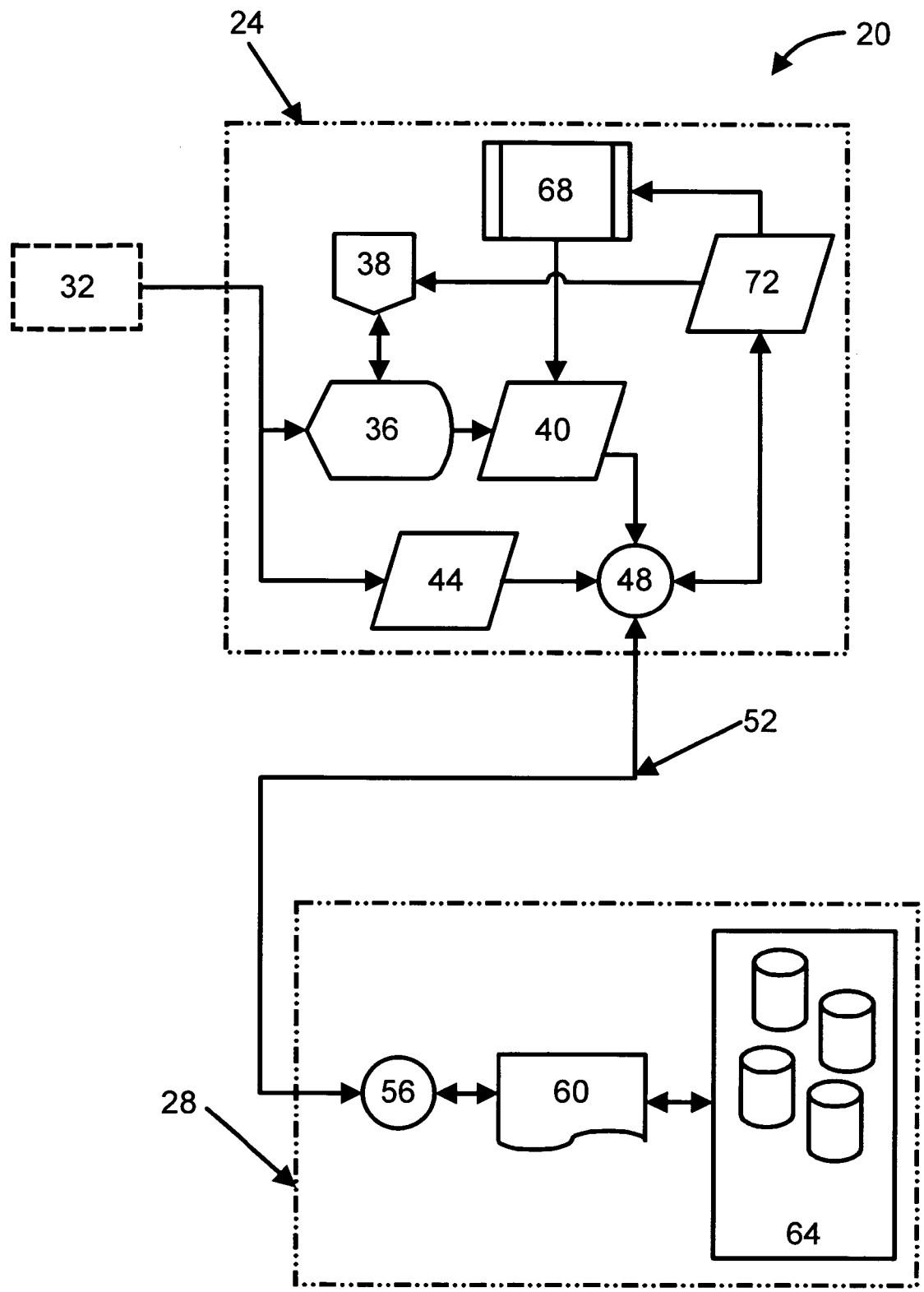
FIG. 1 shows a schematic representation of a storage system comprising a client portion and a server portion in accordance with the present invention.

A storage system, in accordance with an embodiment of the present invention, is indicated generally at 20 in FIG. 1. System 20 includes a client portion 24, which operates at the premises of the client organization utilizing the services of storage system 20, or other trusted location, and a server portion 28, which is located at the service provider who offers the services of system 20.

Client portion 24 receives copies of electronic documents from one or more sources 32. In many circumstances, sources 32 will be one or more email servers of the client organization but, as will be apparent to those of skill in the art from the following discussion, the present invention is not limited to the storage of email and any other electronic document of interest, such as word processing documents, program source code, etc. can be stored by system 20 and thus sources 32 can include a document management system, etc.

Source 32 can provide copies of electronic documents in real time, as they are stored on source 32, or more commonly, on a batch basis wherein copies of electronic documents are provided to client portion 24 at regular intervals (e.g.—hourly or daily) or in tranches of a given size (e.g.—a set of documents of a total size of between 20 and 30 MB) or based upon any other suitable criteria as may be desired.

When source 32 provides one or more electronic documents to client portion 24, a parser 36 first processes the received documents. If multiple types of documents are stored within system 20, parser 36 can first identify the types of the received documents and this determination can be achieved in a variety of manners including: source 32 explicitly providing such information to parser 36 along with the documents; by parser 36 examining the contents of the documents and comparing them to known types; by parser 36 comparing a filename extension to a list of known extensions; etc.

For a text, html or email document, parser 36 will create a list of all of the terms of interest included in the document. As will be apparent to those of skill in the art, various words such as "a" and "the" can be deemed to not be terms of interest, and thus can be excluded from the produced list, in the manner of many indexing systems.

Preferably, parser 36 is also operable to utilize metadata definitions provided to it, either previously or with the electronic document, to identify and construct enhanced search data. For example, in the case of email documents, the defined metadata can include appropriately defined metadata categories such as a "TO" field, a "FROM" field, a "CC" and/or "BCC" field, a "SUBJECT" field, a "SENT DATE" field, a "RECEIVED DATE" field, and a main body field. With such metadata, in addition to identifying appropriate search terms, parser 36 can also relate identified terms to the metadata fields, for example relating the identified term "Budget" (amongst others) to the SUBJECT metadata field for an email discussing a financial budget when the email had a subject line of "$1^{st}$ Quarter Budget".

The construction of parser 36 is not particularly limited and, as will be apparent to those of skill in the art, can be a general purpose computer system executing appropriate software or can be a purpose built device. In a present embodiment of the invention, source 32 comprises one or more Microsoft Exchange email servers and parser 36 employs the MAPI interface to these servers to create the list of terms of interest. As will be apparent, other email servers or document sources typically provide similar interfaces and/or other appropriate mechanisms for parser 36 to construct the list of terms of interest.

For documents other than email, parser 36 can create a list of appropriate terms of interest which indicates, for example, the author, document name, its size, its date of creation, etc. and/or can process the document with appropriate metadata fields, such as "AUTHOR", "FILETYPE", "CREATION DATE", etc.

Once all of the identified terms of interest in a received copy of an electronic document have been processed by parser 36, the terms and related metadata information are passed to a dictionary tool 38 and to an encryptor 40 as an ordered list of terms. By providing the list as an ordered list of terms, adjacency information, occurrence counts, etc. can be created and maintained at server portion 28, as described below.

Dictionary tool 38 creates and maintains a list of all extracted terms of interest processed by client portion 24 and, optionally, their related metadata information, if any, for use in searching for stored encrypted documents, as will be described further below.

Encryptor 40 encrypts the extracted list of terms of interest into a list of ciphertext equivalents. Like parser 36, encryptor 40 can be implemented in a variety of manners including a general purpose computing device executing appropriate encryption software. If warranted by the number and size of electronic documents to be stored by system 20, encryptor 40 can be a purpose built encryption device or, more commonly, can be a general purpose computer system including one or more hardware or software encryption engines. Such hardware and software encryption engines are commercially available, as is known to those of skill in the art.

The complete copy of the electronic document received from source 32 is encrypted by a second encryptor 44 and, as was the case with encryptor 40, encryptor 44 can be a purpose built encryption device or can be a general purpose computer system including one or more hardware or software encryption engines.

The processing by client portion 24 can be performed on a per document basis or can be batched to occur when a pre-selected time period has expired (i.e.—hourly, daily, etc.), when a pre-selected number of documents are ready for transfer, etc.

When the terms of interest and the complete document have been encrypted, the resulting ciphertext copy of the document produced by second encryptor 44 and the set of encrypted identified terms produced by encryptor 40 are transferred to server portion 28. In the illustrated embodiment, the transfer of the encrypted terms and the ciphertext copy of the electronic document is effected via a telecommunication manager 48 and a data link 52.

While it is presently preferred that dictionary tool 38 be located at client portion 24, it is also contemplated that dictionary tool 38 can be located at server portion 28. In such a circumstance, it can be assured that a valid and up to date dictionary can always be available, even if client portion 24 has recovered from a hardware or software failure. In this case, the encrypted list of terms of interest are transferred to server portion 28 and dictionary tool 38 creates the dictionary for the encrypted terms. The dictionary of encrypted terms is then transmitted to client portion 24 at appropriate intervals from server portion 28, such as after each batch of documents has been processed by system 20, and client portion 24 will decrypt the terms in the received dictionary to obtain a working dictionary which can be used, as described below.

Telecommunications manager 48 can be a general purpose computer which implements a suitable communication management program, such as an FTP server, a web-service based manager such as SOAP-XML over http or https, etc.

To provide better security, telecommunications link 52 is preferably a trusted link, such as a VPN implemented on telecommunications manager 48 and operating over the Internet or a private communications link, but link 52 can be an untrusted link, such as the Internet.

In a presently preferred embodiment of the invention, client portion 24 is configured and supplied to clients of the service as an appliance, comprising one or more computing devices, which operates at the clients' premises and which requires little, if any, active management or maintenance by the client. In a preferred aspect of the present invention, no important information is maintained in client portion 24 beyond the encryption keys for encryptors 40 and 44 and the list of terms in dictionary tool 38.

It is contemplated that the encryption keys will be properly maintained in an appropriate manner as is well known to those of skill in the art and will thus be available to the client in the event of a hardware or software failure of client portion 24.

In the case of a failure of client portion 24, it is contemplated that the list of terms in dictionary tool 38 can either be encrypted at selected time intervals and sent to server portion 28 for storage and backup or can be reconstructed, if necessary, from information stored at server portion 28 and sent to a repaired client portion 24 as described further below.

Thus, there is no need to provide data backup services for client portion 24. Client portion 24 can therefore be viewed as an appliance which is located at the client premises and which operates without substantial management being required from either the client or the service provider.

However, as client portion 24 is intended to operate with little, if any, active management it is conceivable, however unlikely, that an error may occur at client portion 24 which would invalidate the encryption keys for encryptors 40 and 44. If such an error were to occur and was undetected for some period of time, any terms and/or documents encrypted by encryptors 40 and 44 would no longer be decryptable and the contents of these documents could be irretrievably lost.

To prevent such loss of the contents of documents, client portion 24 performs a validation of the encryption keys at regular intervals, preferably before commencing a processing cycle on documents. If client portion 24 operates on a document by document processing cycle, the validation is performed for each document. If client portion 24 operates on a batch basis, the validation is performed prior to processing each batch.

In a present embodiment of the invention, encryption key validation is performed by, preferably before the encryption keys for encryptors 40 and 44 are first used, initially creating a set of test data (which can be randomly generated or generated in any other suitable manner). A digital signature, such as an MD5 hash, suitably strong CRC or other signature technique, is then determined for the test data. Next, the test data is encrypted with the key to be validated to obtain a ciphertext version of the test data. Finally, a digital signature is determined for the ciphertext test data. Then the ciphertext test data and the digital signatures for the test data and for the ciphertext test data, referred to herein as a validation data set, are transferred to server portion 28 for storage.

To validate an encryption key, client portion 24 retrieves a copy of the validation data set from server portion 28. Once retrieved, client portion 24 determines the digital signature for the received copy of the ciphertext test data and compares the digital signature it has determined for the received copy of the ciphertext test data with the digital signature for the ciphertext test data that it received in the validation data set.

If the received digital signature and the determined digital signature for the ciphertext test data are the same, then client portion 24 decrypts the received ciphertext test data with the encryption key being validated to obtain the test data which it then determines a digital signature for. This determined digital signature is then compared to the digital signature for the test data received in the validation data set. If the determined digital signature matches the received digital signature, then client portion 24 is assured that the encryption key has not been corrupted.

If the determined and received digital signatures do not match, client portion 24 will ask server portion 28 to transmit the validation data set again to reattempt the validation process to determine if the error was due to corruption of the validation data set during transmission. After a selected number of retry attempts, for example two, client portion 24 deems the key being validated to have been corrupted and client portion 24 will generate an appropriate error message to the user of client portion 24 and/or the operator of server portion 28 and appropriate steps can be taken to rectify the error.

While it is presently preferred that client portion 24 validate its encryption keys before each processing cycle, the validation of encryption keys can be performed more or less frequently if desired.

Server portion 28 comprises a telecommunications manager 56, to interoperate with telecommunications manager 48, an indexer and search engine 60 and a storage device 64. As will become apparent from the following description, server portion 28 need not be at a trusted location and need only be located at a location with appropriate levels of infrastructure services, such as fire safety, physical security, power backup, etc.

Data sets of the encrypted terms of each document and the ciphertext of the complete documents are received at telecommunication manager 56 and are first provided to indexer and search engine 60 before storage in storage device 64.

Storage device 64 can be any suitable mass storage device as will occur to those of skill in the art, such as a disc farm, tape library, optical storage devices or any combination of such devices which provides sufficient storage of data. Ideally, storage device 64 provides services which allow for the aging of the stored information, allowing for older stored data to be moved from more expensive devices which provide high speed access, such as disc drives, to less expensive storage devices, which may require longer access times, such as tape libraries or WORM (write once read many) optical discs, etc. Such aging and archiving systems are well known to those of skill in the art and will not be discussed further herein.

When indexer and search engine 60 receives a ciphertext document from telecommunications manager 56, it first assigns a unique identifier to the document and then it processes the corresponding encrypted terms which have also been received from telecommunications manager 56, adding them to an index of encrypted terms it maintains on storage device 64, referencing the unique identifier assigned to the ciphertext copy of the document and the document is also stored on storage device 64 using the assigned unique identifier.

An example of the storage of an email document will now be described, where the example message is shown below. After creation in a conventional manner, this message is transferred from source 32 to client portion 24 where it is first processed by parser 36. After processing by parser 36, the terms of interest shown in the second paragraph below have been extracted. In this example, parser 36 operates with a "skip list" of common terms which it does not process, such as "a", "the", "I", etc. While not necessary, the use of such a skip list is often preferred as it reduces the number of terms to be processed with little decrease in the usefulness of an index created from the remaining terms. EMAIL: "TO: C"; "FROM: Paul"; "CC: M"; "SUBJECT: Q1 Budget"; "Dear C: I text1 text2 text3 a text4 text5 text6 text7 , Paul"; "SENT DATE: Aug. 1, 2003"; "SENT TIME: 17:00."

As also shown, parser 36 has determined (either: implicitly from the source of the email—an email server—or from the format of the electronic file; explicitly from an appropriate identifier provided to parser 36 prior to its processing of the document; or via any other suitable manner of informing parser 36 of the nature of the document as will occur to those of skill in the art) that the provided electronic document is an email document and it has processed the email document using an appropriate set of predefined metadata which was previously provided to it including definitions of: "To"; "From"; "CC"; "Subject"; "Sent Date"; "Sent Time"; and "Body" fields.

As shown in below, fourteen terms of interest have been identified in the email, and the presence of these terms in one or more of the seven metadata fields has also been recorded. FOURTEEN TERMS: 1.=C; 2.=Paul; 3.=M; 4.=Q1; 5.=Budget; 6.=text1; 7.=text2; 8.=text3; 9.=text4; 10.=text5; 11.=text6; 12.=text7; 13.=Aug. 1, 2003; 14.=17:00. SEVEN METADATA FIELDS: "From"=2; "CC"=3; "Sent Date"=13; "Sent Time"=14; "Body"=1, 2, 6, 7, 5, 8, 9, 10, 11, 12.

This output from parser 36 is then provided to dictionary tool 38, which adds to the list of terms it maintains any of these terms of interest which are not presently in the list. The output of parser 36 is also provided to encryptor 40 which operates on the identified terms and encrypts them into ciphertext equivalents, as shown below. Exceptions can be defined for some terms of interest so that they are not encrypted and, in this example, the client and/or service provider have decided that date and time fields will not be encrypted to provide for easier/faster searching and sorting of stored messages. FOURTEEN TERMS AND CIPHERTEXT EQUIVALENTS: 1.C=a; 2.Paul=qpfn; 3. M=e; 4. Q1=mn; 5. Budget=leoris; 6. text1=qazxs; 7. text2=wscde; 8. text3=tgbnh; 9. text4=mjyui; 10. text5=lopik; 11. text6=nhtyu; 12. text7=gbvfr; 13. Aug. 1, 2003=Aug. 1, 2003; 14. 17:00=17:00.

The entire document is provided to encryptor 44 which encrypts the document and provides the ciphertext result to telecommunications manager 48 which also receives the list of ciphertext terms and metadata information from encryptor 40, the metadata information indicating the encrypted terms which appear in each of the predefined metadata fields and telecommunications manager 48 transmits this data, over communications link 52, to server portion 28.

Thus, the information transferred to server portion 28 from client portion 24 comprises an encrypted copy of the electronic document, a list of terms, also encrypted, which appear in the electronic document and a list indicating the metadata fields that the terms appear in. As will be apparent, provided that server portion 28 does not have the necessary encryption keys to decrypt the ciphertext versions of the electronic document or the identified terms, the operator/service provider of server portion 28 need not be a trusted party as they cannot access or modify the content of the encrypted electronic document.

When telecommunications manager 56 at server portion 28 receives the encrypted electronic document and the list of encrypted terms and the information about where, if at all, those terms appear in metadata fields, the encrypted document is assigned a unique identifier (for example a serial number) by indexer and search engine 60 and the encrypted document is stored in storage device 64, indexed by the assigned unique identifier.

The list of encrypted terms and the metadata list are processed by indexer and search engine 60, in reference to the unique identifier assigned to the identify the encrypted document, to update the index, which is maintained by indexer and search engine 60, of documents stored on storage device 64. This index contains an amalgamated list of all of the encrypted search terms of all of the documents stored in storage device 64, adjacency information, occurrence information, etc. and the related metadata information, referenced to the unique identifiers.

When the client of the service wishes to locate and retrieve a document stored on storage device 64, they access a search and retrieval interface 68 at client portion 24, which can be implemented as an html page on a web server, or an search and retrieval form on a dedicated computing device, etc. and the user constructs an appropriate search query. This search query can be Boolean-based, or can employ any other suitable search language and can refer to terms of interest and/or metadata fields defined for the corresponding document types stored on storage device 64. For example, if the client is searching for an email, a list of the metadata fields defined for the emails stored on storage device 64 can be provided to the client either previously or dynamically, from server portion 28 over telecommunications link 52, and used to construct an appropriate search query.

An example query, wherein the client is searching for emails from "Paul" where the subject contained the word "budget" and where the message was sent in the third quarter of 2003, could be:

FROM="Paul" AND SUBJECT="Budget" AND SENT="Jul. 1, 2003 TO Sep. 30, 2003";

The actual method of constructing the query is not particularly limited and any suitable system as will occur to those of skill in the art can be employed.

Once an appropriate query is created with search and retrieval interface 68, the query is forwarded to encryptor 40 which encrypts each of the search terms in the query with the appropriate encryption key or keys, to obtain the query with encrypted terms. In this example, and using the example shown above, after processing by encryptor 40 the query would be:

FROM="qpfn" AND SUBJECT="leoris"AND SENT="Jul. 1, 2003 TO Sep. 30, 2003";

Where, in this particular example, the date range is not encrypted as the date fields in the index on storage device 64 are not encrypted.

The query with the encrypted search terms is then provided to indexer and search engine 60 in client portion 28 via telecommunication managers 48 and 56 via communications link 52. Indexer and search engine 60 examines the query and compares the defined criteria of the search query to the index it maintains for the documents stored on storage device 64. When the indexer and search engine 60 identifies the unique identifiers for all of the encrypted documents stored on storage device 64, the corresponding encrypted documents are retrieved from storage device 64 and are forwarded to a decryptor 72 in client device 24 via telecommunications managers 56 and 48 via communications link 52.

Decryptor 72 decrypts each retrieved document, using the appropriate decryption key, and provides the plaintext results for each document to search and retrieval interface 68 where the user can access and/or copy the retrieved plaintext documents.

In the event that it is desired to employ one or more wildcards in a search query, where the wildcards are applied to terms which are subject to encryption, the client creates the search query in a conventional manner, for example:

FROM="P*" AND SUBJECT="Budget" AND SENT="Jul. 1, 2003 TO Sep. 30, 2003";

where '*' is a wildcard and where the client is attempting to locate documents authored by everyone whose name begins with the letter "P", where the subject includes the word "Budget" in a date range of interest.

In such a case, in constructing the search query with the encrypted terms, search and retrieval interface 68 expands the search query, using the dictionary list of terms maintained by dictionary tool 38, to include all of the terms which would be covered by the wild card. The wildcard expansion is performed on the relevant search term, in this example "P", and is used to select the matching terms from the list in dictionary tool 38.

Assuming that client portion 24 has previously stored documents authored by "Paul" (which has a ciphertext equivalent of "qpfn"), "Pierre" (which, for example, has a ciphertext equivalent of "wqfesw" and by "Peter" (which, for example, has a ciphertext equivalent of "mmotz") on storage device 64, dictionary tool 38 returns the ciphertext equivalents of each term in its list that matches the wildcard expansion. In this example, search and retrieval interface 68 expands the search query to obtain:

(FROM="qpfn" OR FROM="wqfesw" OR FROM="mmotz") AND SUBJECT="Budget" AND SENT="Jul. 1, 2003 TO Sep. 30, 2003";

which expanded query is then forwarded to indexer and search engine 60 in server portion 28, as previously described.

In determining which terms match the wildcard expansion, dictionary tool 38 preferably also considers the metadata field which the dictionary terms occurred in to identify appropriate terms. For example, the expansion of 'FROM="P*"' will not match to terms in the list maintained by dictionary tool 38 which were not found in the "FROM" metadata field and thus terms such as "production", "profit", etc. which were located within the "Body" metadata field of various stored documents are not used to expand the search query.

As mentioned above, it is preferred that from time to time client portion 24 encrypt the list maintained by dictionary tool 38 and forward the resulting ciphertext backup version of the list to server portion 28 to store on storage device 64. In the event the list maintained by dictionary tool 38 is subsequently corrupted or otherwise lost, due to a failure at client portion 24 or other error, the most recent ciphertext version of the list stored on storage device 64 can be transferred back to client portion 24 and decrypted by decryptor 72 and then provided to dictionary tool 38.

Once dictionary tool 38 has received the replacement list, dictionary tool 38 then updates the list to add the terms which occurred after the ciphertext backup version was created. Specifically, dictionary tool 38 can query indexer and search engine 60 at server portion 28 to get copies of all encrypted terms in the index maintained by indexer and search engine 60 other than those it has in its replacement list.

Alternatively, a copy of the index maintained by indexer and search engine 60 can be transferred to client portion 24. Decryptor 72 can decrypt the terms in the copy of the index and can provide all of those terms and their related metadata information to dictionary tool 38 which can then reconstruct the list.

As will now be apparent to those of skill in the art, system 20 allows for the storage and archiving of electronic documents at a service provider is a secure manner, without requiring that service provider be trusted and yet still providing the client with a versatile and effective manner of securely searching and retrieving electronic documents from storage. Client portion 24 can be implemented as an appliance, comprising one or more computing devices and related software, which requires little, if any, active management of the client or the service provider. Further, with the exception of encryption keys that are managed in any suitable manner, no information which is essential to the operation of service 20 is maintained in client portion 24 and thus, the client of the services of system 20 need not worry about backing up information in client portion 24.

A preferred additional aspect of the present invention is the ability to provide an more useful archive of electronic documents such as email. Specifically, it is now common to include attachments with email documents and/or links, such as a URL or other hypertext link within emails and it can be difficult to later determine what was being communicated within the email if the attachment is not available with the email and/or if the information pointed at by the link has been modified or no longer exists.

Accordingly, in another embodiment of the present invention, parser 36 also operates to identify attachments to email documents. The filenames, or other appropriate identifiers, of attachments to an email are listed in an "Attachment" metadata field which is provided to encryptor 40. The filenames and other identifiers are provided to indexer 38 and are stored in dictionary 42 in a similar manner to the other terms of interest, as described above. Further, the attachments are provided to second encryptor 44 and are encrypted to ciphertext versions which are provided to indexer and search engine 60 in a similar manner to the encrypted copies of the documents, as described above. Thus, a user can retrieve a document such as an email, along with any attached documents if desired.

For dynamic documents, which can change or even disappear over time, such as html web pages, or other hyper-text documents, parser 36 is further equipped with a content reference engine. As parser 36 parses a document, any identified URL or other link is accessed by the content reference engine which makes a copy of indicated information, be it a web page, data file or any other information. In addition to making a copy of the indicated information, preferably the content reference engine also makes a record of when it made the copy of the information. These copies of linked information are then treated like attachments to the original document and are processed as described above by system 20.

If desired, for attachments, such as word processing documents or other text documents, parser 36 can examine and process the attachment in the same manner as the email or other document to which it was attached. In such a case, the attachment is treated like any other document from a source 32, albeit with an additional metadata entry indicating that he document was an attachment to another document and the identity of that other document.

Another preferred additional aspect of the present invention is ability to implement document retention policies. As is known, due to corporate, statutory and regulatory requirements, it is often desired to retain different types of documents for different periods of time. In such a case, categories of such documents can be defined, with an appropriate retention period and identifying characteristics being specified for each category. For example, documents created by executives of a company, whether they be emails or any other documents, may be categorized to be retained for seven years, while emails to or from employees other than executives may be categorized to be retained for three years.

Figure 2:
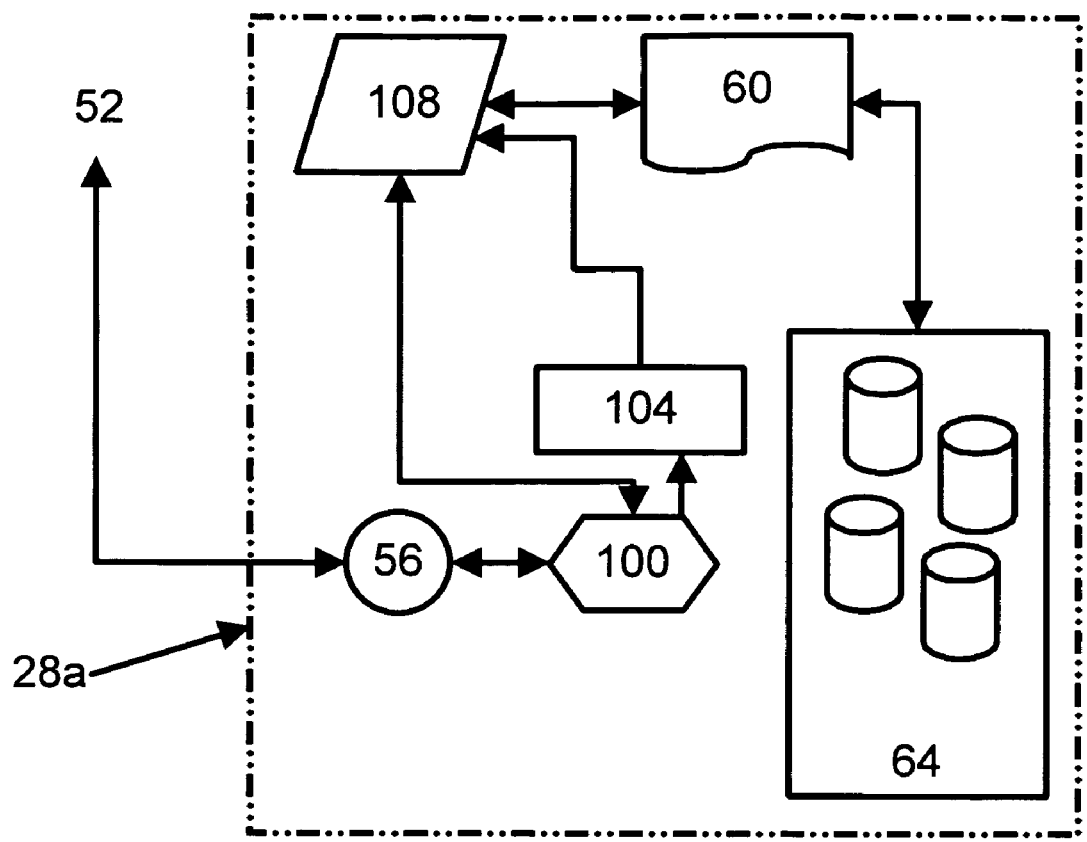
FIG. 2 shows a schematic representation of another embodiment of the server portion of FIG. 1.

In this aspect of the present invention, the client of the service provided by system 20 defines the set of categories for the retention policies, including the criteria for each category and the time the documents in each category are to be maintained. These definitions are passed to server portion 28 where they are received by a retention manager 100 in the embodiment of the server portion 28a, shown in FIG. 2.

When the ciphertext set of terms and metadata and the ciphertext copy of a document to be stored on storage device 64 are received at server portion 28a, retention manager 100 examines the terms and metadata and uses the predefined criteria to determine the appropriate retention period for the document and to calculate the date on which the document is to be destroyed.

A retention key manager 104 maintains a set of encryption keys with every destruction period having a unique key defined for it. For example, if the maximum retention period in the defined document retention policies is seven years, then retention key manager 104 will maintain a set of eighty-four encryption keys at all times, one for each month of the seven year (e.g.—from January 2005 to December 2011) window.

On an ongoing basis, at the end of a month, (for example January 2005) retention key manager 104 will destroy the key for that month and will add new key for the month now within the seven year window (in this example January 2012).

Once retention manager 100 has determined the appropriate destruction date for a received ciphertext copy of a document, this date is provided to retention key manager 104 which provides the retention key defined for that destruction date to an encryptor 108.

Encryptor 108 then encrypts the ciphertext document to be stored with the retention key provided by retention key manager 104 and this double encrypted ciphertext copy of the document is stored on storage device 64 along with an indication of its intended destruction date.

If a document is to be retrieved from storage device 64, in response to a search initiated at client portion 24 or elsewhere, the doubly-encrypted document is retrieved from storage device 64 by indexer and search engine 60 and the document is provided to encryptor 108 along with the indication of the destruction date of the document. Encryptor 108 requests the retention key for that destruction date from retention key manager 104 and, if the key still exists on retention key manager 104, the key is provided to encryptor 108 which decrypts the doubly-encrypted document to obtain a singly encrypted document which is then forwarded to client portion 24, as before.

In the event that retention key manager 104 no longer has the retention key for the destruction date of the requested document (i.e.—the destruction date has passed and retention key manager 104 has deleted the key), then the retrieved document is effectively destroyed as it can no longer be decrypted.

By implementing document retention services as described above, documents in different retention categories can be stored in a single archive without affecting each others retention. Thus, documents stored on storage device 64 can be grouped into convenient stores and moved between different storage modalities (disc, tape, optical, etc) to manage the storage capacity of storage device 64 independent of the individual document's retention needs.

As will be apparent, the security and proper operation of system 20 depends upon the implementation and use of proper encryption key management techniques, however such techniques are well known to those of skill in the art and need not be further discussed in any detail herein.

In one configuration, system 20 has a master key defined for it comprising an asymmetric key pair. The user of the services provided by system 20 holds the pair of asymmetric keys and one key is used by client portion 24 as a master encryption key and the other key is used by client portion 24 as a master decryption key. This master key pair is used to implement all other key management within system 20.

Encryption of documents and document terms and metadata information by encryptors 40 and 44 is preferably performed using a symmetric key which can be changed from time to time using the master key pair and known key management techniques. The key employed by encryptor 40 can be changed with a different frequency than the key employed by encryptor 44 and, in fact, the key employed by encryptor 40 can be used for relatively long periods of time, so that the index constructed by indexer and search engine 60 remains relevant, while the key employed by encryptor 44 can be changed frequently to enhance document security.

While the key employed by encryptor 40 need not be maintained once it has been replaced, as the index constructed by indexer and search engine 60 can be reconstructed with the replacement key, the key employed by encryptor 44 to encrypt and decrypt the copies of the documents stored on storage device 64 must be maintained, even after it has been superceded by a new key to allow stored ciphertext versions of documents to be decrypted when desired.

As will be apparent, a certificate authority, or other key management service, can also easily be incorporated within system 20, if desired.

The present invention provides a storage system which allows a client to securely store and retrieve electronic documents from a storage system maintained by a service provider who is not necessarily trusted. Search and retrieval of the stored documents by the client is simple and effective and wildcard type searches can be performed. Additionally, in another embodiment the storage system can also store attached documents and/or copies of web pages or other time varying information with the stored document in a manner which is transparent to the client. Also, in another embodiment, the storage system can implement document retention and destruction functions, ensuring that documents are retained for necessary time periods, after which they are automatically destroyed.

To determine the authenticity and/or provenance of documents stored in system 20, in a preferred aspect client portion 24 further processes each document received from source 32. Specifically, for each document client portion 24 determines a digital signature of the plaintext version of the document and determines a digital signature of the ciphertext version of the document, after encryption by encryptor 44, and both of these digital signatures are also forwarded to server portion 28 along with the ciphertext copy of the respective document. These digital signatures are stored on storage device 64 and can be retrieved by client portion 28, when the respective document is retrieved, to verify that the document has not been altered.

The above-described embodiments of the invention are intended to be examples of the present invention and alterations and modifications may be effected thereto, by those of skill in the art, without departing from the scope of the invention which is defined solely by the claims appended hereto.

We claim:

1. A system for storing electronic documents in a secure and searchable manner, the system including a client portion and a server portion, the client portion being located at a trusted location and comprising:

a parser to parse electronic documents received at the client portion to identify terms of interest within the received electronic document;

a search and retrieval interface to specify one or more terms of interest to identify and retrieve one or more documents from the server portion;

a first encryptor to encrypt identified terms of interest to obtain ciphertext versions of the terms of interest;

a second encryptor to encrypt the received document to obtain a ciphertext version of the received document;

a decryptor to decrypt a ciphertext version of a retrieved document to obtain a plaintext version; and client communications means to transfer the ciphertext version of the received document and the ciphertext version of the identified terms to the server portion and to receive a ciphertext version of documents from the server portion; and the server portion comprising:

server communications means to receive from a client portion the ciphertext version of a document and the ciphertext version of identified terms and to transfer the ciphertext version of an identified document to the client portion;

a storage device to store ciphertext versions of documents received from the client portion;

an indexer and search engine to construct and maintain a searchable index of received ciphertext versions of identified terms contained in the ciphertext versions of documents received from the client portion and responsive to the search and retrieval interface of the client portion to cause the storage device and the server communications means to transfer ciphertext copies of the identified documents of interest to the client portion;

an encryptor to encrypt ciphertext documents received at the server portion and to decrypt ciphertext documents to be transferred to the client portion;

a retention manager operable to determine the relevant destruction date for each ciphertext document received at the server portion; and a retention key manager storing an encryption key for each destruction date of documents stored in the storage device, the retention key manager responsive to the retention manager to provide the encryption key for the relevant destruction date to the encryptor and to destroy encryption keys whose related destruction date has passed, wherein the retention manager compares one or more characteristics of each received ciphertext document to predefined criteria to determine the relevant destruction date for the received document; and a dictionary tool operable to maintain a list of the identified plaintext terms of interest for all documents received at the client portion and wherein wildcard terms specified at the search and retrieval interface are matched to terms in the maintained list, the matched terms being encrypted by the first encryptor.

2. The system of claim 1 wherein the client communications means and the server communications means communicate via an encrypted link.

3. The system of claim 1 wherein the second encryptor is the decryptor.

4. The system of claim 1 wherein the parser also operates to relate identified terms of interest to at least one metadata field for the received document.

5. The system of claim 1 wherein the client portion is further operable to encrypt and transfer to the server portion ciphertext copies of attachments to documents received at the client portion and the server portion is further operable to index and store the ciphertext copies of attachments in the storage device.

6. The system of claim 1 wherein the parser further includes a content reference engine operable to copy dynamic documents referred to in the received document, the client portion being operable to encrypt the copies of dynamic documents to obtain ciphertext copies of the dynamic documents and the server portion being operable to store to the ciphertext copies of the dynamic documents.

7. A method of securely storing electronic documents in a secure and searchable manner, comprising the steps of:

at a trusted location, receiving copies of electronic documents to be stored;

parsing the received copies to identify terms of interest in the documents;

validating at the client portion an encryption key to be used to encrypt the received copies of electronic documents by:

(a) retrieving from the server portion a validation data set comprising plaintext test data, a ciphertext version of the plaintext test data previously encrypted with the key to be validated, and a digital signature for each of the plaintext test data and ciphertext version of the plaintext data;

(b) determining a digital signature for the plaintext test data and comparing the determined digital signature to the retrieved digital signature for the plaintext data set to determine if the plaintext data set has been corrupted and determining a digital signature for the cyphertext version of the plaintext test data and comparing the determined digital signature to the retrieved digital signature for the cyphertext version of the plaintext data set to determine if the cyphertext version of the plaintext data set has been corrupted;

(c) if either or both of the plaintext data set and the cyphertext version of the plaintext data set has been corrupted, performing steps (a) and (b) again to obtain an uncorrupted validation data set; and (d) encrypting the plaintext data set with the encryption key to be validated and comparing the resulting cyphertext version of the plaintext data set to the ciphertext version of the plaintext data set in the retrieved uncorrupted validation data set and deeming the encryption key to be valid if the encrypted the plaintext data set is identical to the ciphertext version of the plaintext data set in the retrieved uncorrupted validation data set and otherwise deeming the encryption key to be invalid;

encrypting the received documents to obtain ciphertext versions of the received documents and encrypting the identified terms of interest found in each document to obtain ciphertext copies of the terms;

transferring the ciphertext copies of the documents and identified terms to a second location over a communications link;

receiving the ciphertext copies of the documents at the second location and storing received ciphertext copies on a storage device;

receiving the ciphertext copies of the identified terms of interest at the second location and constructing and maintaining an index which indicates, for each received ciphertext term of interest, the storage location of each ciphertext copy of the documents which contains the term of interest;

providing a search interface at the trusted location wherein a user can search for a stored ciphertext copy of a document stored on the storage device by defining a query containing one or more plaintext terms of interest, the plaintext terms of interest being encrypted and, over the communications link, being compared to the ciphertext terms in the index to identify the ciphertext copies of documents stored on the storage device;

transmitting the identified ciphertext copies of documents over the communications link to the trusted location and decrypting the transmitted cyphertext copies of the documents at the trusted location to obtain plaintext copies of the identified documents; and using a dictionary tool to maintain a list of identified terms of interest at the trusted location and accepting queries at the search interface including one or more wildcard operators and examining the maintained list of identified terms of interest to expanding the wildcard operators in the query.

8. The method of claim 7 further comprising the step of encrypting copies of attachments to received documents and storing the resulting ciphertext copies of the attachments in the storage device.

9. The method of claim 7 further comprising the step of copying dynamic documents referred to in the received documents; encrypting the copies of the dynamic documents to obtain ciphertext copies of the dynamic documents; and storing the ciphertext copies of the dynamic documents in the storage device.

* * * * *